Sept. 22, 1931.  G. J. MORRIS  1,824,492
WALL FIXTURE ATTACHING MEANS
Filed Oct. 10, 1928
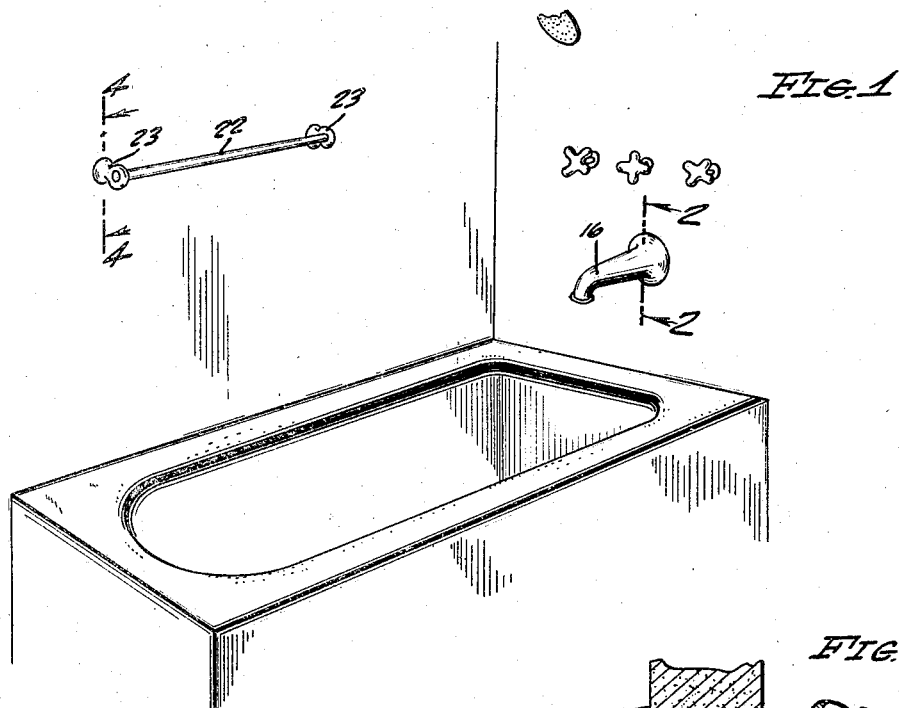
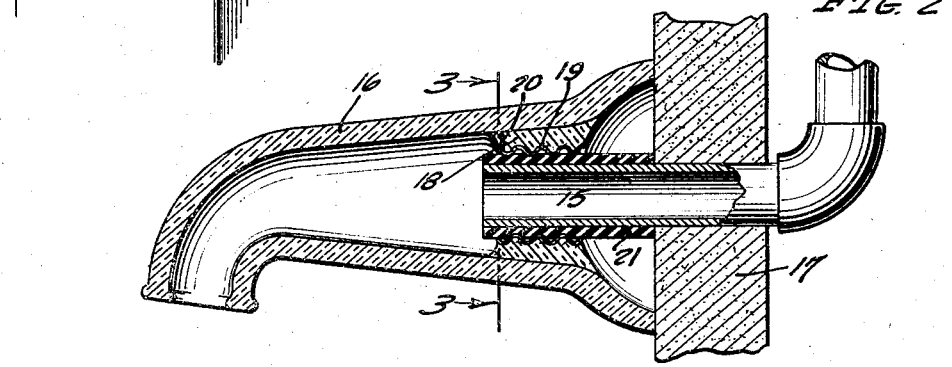
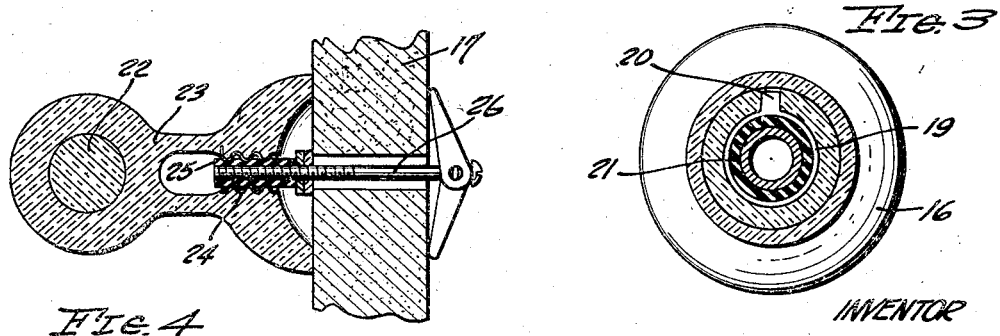
INVENTOR
GEORGE J. MORRIS
BY *Munn & Co.*
ATTORNEYS Patented Sept. 22, 1931

1,824,492

UNITED STATES PATENT OFFICE

GEORGE J. MORRIS, OF LOS ANGELES, CALIFORNIA

WALL FIXTURE ATTACHING MEANS

Application filed October 10, 1928. Serial No. 311,573.

My invention relates to and has for its broad purpose the provision of a means for securing a wall fixture in fixed position on the surface of a wall, my invention being characterized by its extreme simplicity; low cost of manufacture; ease of application and removal; and high degree of effectiveness to securely retain the wall fixture in position on a wall.

Specifically, my invention has for its purpose the provision of means for fixedly attaching a towel rack or a water nozzle to a wall, and to the elimination of the many and relatively expensive parts heretofore necessary to secure a towel rack, water nozzle or similar bathroom fixture to a wall.

I will describe only two forms of wall fixture attaching means embodying my invention and will then point out the novel features in the claims.

In the accompanying drawings:

Figure 1 is a view showing in perspective a section of a bathroom illustrating a water discharge nozzle; and a towel rack having embodied therein two forms of attaching means embodying my invention;

Fig. 2 is an enlarged vertical sectional view taken on the line 2—2 of Fig. 1;

Fig. 3 is a sectional view taken on the line 3—3 of Fig. 2;

Fig. 4 is an enlarged sectional view taken on the line 4—4 of Fig. 1.

Similar reference characters refer to similar parts in each of the several views.

In the embodiment of my invention illustrated in Figs. 1 to 3 inclusive, it is applied to water outlet pipe 15 and a water discharge nozzle 16, the pipe being extended through the wall 17 of the bathroom so that a portion thereof projects from the outer side of the wall, as clearly illustrated in Fig. 2. The nozzle 16 is formed of porcelain or other suitable plastic material, and is of conventional construction, with the exception that it is built up during the molding thereof, or subsequent thereto, with a quantity of plastic material to provide a restricted portion 18 through which the pipe 15 is adapted to extend. Where it is possible to cast the portion 18 integral with the nozzle, such portion is, of course, constructed of the same material as the nozzle, but where it is molded separately, that is, after the molding of the nozzle, such portion may be constructed of plaster of Paris. If the portion 18 is cast integral with the nozzle its surface could be molded to provide screw threads, but if the portion 18 is cast separately it is provided with a metal collar 19 having screw threads exteriorly, which are embedded in the plastic material, and screw threads interiorly to coact with a member mounted on the pipe 15 for securing a nozzle to the pipe. The exterior threads of the collar co-operate with a radially disposed lug 20 on the collar (Fig. 3), to secure the collar against rotation within the restricted portion 18 in order that the nozzle may be screwed into the pipe without fear of loosening the collar. As shown in Fig. 2, the lug is embedded in the plastic material of which the restricted portion 18 is formed.

The member engaged by the interior threads of the collar 19 is the sleeve 21, formed of rubber or any other suitable elastic and resilient material, which is capable of being compressed by the interior threads of the collar to form grooves, in which the threads are seated so that the collar can be threaded on the sleeve. As illustrated in Fig. 2, the sleeve 21 covers the projecting portion of the pipe 15, and is of such internal diameter that when applied to the pipe it is slightly stretched so as to firmly grip the pipe and thus prevent accidental removal therefrom.

In practice, the sleeve 21 is applied to the pipe 15 before or after it is extended through the wall 17. To apply the nozzle it is positioned to cause insertion of the pipe end and sleeve into the collar 19, following which the nozzle is rotated and simultaneously forced inwardly on the pipe, thereby causing the threads of the collar to produce a threading action in respect to the sleeve 21. As the sleeve is formed of rubber or like material, it will yield to the threads of the collar to the extent of forming what may be termed male threads, which, in the final position of the collar, function to frictionally lock the collar and, consequently, the nozzle from accidental removal from the pipe. It will, of course, be understood that by reverse rotation of the nozzle, the collar may be unscrewed from the sleeve, thus allowing complete removal of the nozzle.

An important feature of my invention in its adaptation to water nozzles and pipes is that the sleeve 21 serves as a medium between the nozzle and pipe which yields to expansion of the metal pipe by reason of hot water flowing therethrough thereby preventing such expansion from being transmitted to and breaking the plastic nozzle.

Referring now to Figs. 1 and 4, I have here shown another embodiment of my invention in its adaptation to a towel rack. The towel rack illustrated comprises a rod 22 mounted at its opposite ends in brackets 23. Each bracket is of the construction illustrated in Fig. 4, and as shown it is provided interiorly with a threaded collar 24 adapted to receive and engage a rubber sleeve 25, the latter being secured on the projecting end of a conventional toggle bolt 26 extended through the bathroom wall 17. The threads of the collar 24 indent the rubber sleeve 25 to produce female threads thereon which function to frictionally lock the sleeve and collar together so as to securely retain the towel bracket upon the bolt. As in connection with the nozzle 16, the towel bracket 23 is adapted to be rotated in one direction or the other to apply or remove the collar to or from the sleeve.

Although I have herein shown and described only two forms of wall fixture attaching means embodying my invention, it is to be understood that various changes and modifications may be made herein without departing from the spirit of the invention and the spirit and scope of the appended claims.

I claim:

1. In combination, a rubber sleeve adapted to be applied to a wall projection to tightly embrace the latter, a wall fixture having an opening for receiving the projection and sleeve, and a collar exteriorly threaded with the threads embedded in the fixture and interiorly threaded to compress the sleeve in a spiral path for securing the collar to the sleeve.

2. In combination, a water outlet pipe adapted to project from a wall, a sleeve of elastic material embracing the projecting portion of the pipe, a water nozzle on and receiving the projecting portion of the pipe, and an interiorly threaded collar secured within the nozzle and embracing the sleeve so as to have the threads thereof indented into the sleeve.

3. In combination, a sleeve of elastic material adapted to be applied to a wall projection and having an internal diameter slightly less than that of said projection so that when applied the sleeve is under tension and thus frictionally retained on the projection, and a wall fixture having internal projections positioned to permit the fixture, by a rotating movement, to be applied to and removed from the sleeve, and when applied the projections are indented in the material of which the sleeve is formed.

Signed at Los Angeles, in the county of Los Angeles and State of California, this 1st day of October, A. D. 1928.

GEORGE J. MORRIS.